Patented Apr. 6, 1926.

1,579,611

UNITED STATES PATENT OFFICE.

CHARLES E. HITE, OF PHILADELPHIA, PENNSYLVANIA.

COMPOSITION OF MATTER.

No Drawing. Application filed July 6, 1925. Serial No. 41,879.

*To all whom it may concern:*

Be it known that I, CHARLES E. HITE, a citizen of the United States, residing at Philadelphia, in the county of Philadelphia and State of Pennsylvania, have invented a new and useful Composition of Matter, of which the following is a specification.

My invention relates to a new and useful composition of matter, the same being a continuation in part from my copending application bearing Serial Number 659,804, under date of August 28th, 1923, and has for its primary object to produce an improved hydrated lime which I term "lime sulphur hydrate" consisting of a mixture of hydrated lime made into a plastic mass with a lime sulphur solution and which when thoroughly dried will be uniformly dense and hard throughout the mass.

Commercial hydrated lime is now extensively produced and marketed in bags in order to save the labor involved in slaking or hydrating lime in the old well known way. It may contain hair, plaster of Paris, Portland cement, or sand depending upon the use for which the hydrate is intended.

This hydrated lime of commerce when made into a plastic mortar with sand and water, when dried depends for its strength upon the small amount of calcium silicates and the calcium carbonate formed. These chemical reactions have been found to apply and to occur only on the surface and do not penetrate the plaster to any considerable depth, therefore the plaster is easily broken and crumbles readily with slight pressure.

I have found that by making hydrated lime into a composition with the use of a lime sulphur solution a mortar is produced having greater plasticity and when dry has greater strength than the ordinary lime-sand mortar in common use. My improved mortar is uniform in density and becomes hard throughout the entire mass owing to the chemical action which takes place between the sulphur salts of the lime sulphur solution and a portion of the hydrated lime and when the mortar becomes dry this combination acts as a water-insoluble bond holding the mass together.

I may add to my lime sulphur hydrate materials well known in the art of wall plastering, for example, hair, plaster of Paris, Portland or hydraulic cement, body filling materials, such as sand, cinders, diatomaceous earth, saw-dust and fibrous materials, for example, wood pulp, excelsior, straw, grasses, bast, fibers, asbestos or other body filling or fibrous materials depending upon the use to which the mortar is to be put. I do not claim the above enumerated aggregates as these are well known in the mortar manufacturing business and the plastering trade.

I produce my composition of matter by adding to hydrated lime a sufficient quantity of lime sulphur solution to make a mortar of any desired plasticity. The lime sulphur solution should contain polysulfids and be reduced to a specific gravity of approximately 1.03 whether using a solution made from a concentrate or any other lime sulphur combination.

In actual practice I prefer to use the concentrated lime-sulphur solution referred to on page 78 of Zoological Bulletin, Pennsylvania Department of Agriculture, vol. 1, No. 2, March, 1911, diluted with about seven times its volume of water which is then added to the hydrated lime to make a wet mass of any desired plastic consistency which may be used as a white or finish coat or it may be mixed with sand, hair and the like for the production of a mortar suitable for wall plaster but this composition may be used for other purposes than the production of wall plaster or mortar. Of course I wish it fully understood that I do not limit myself to the use of the diluted lime-sulphur solution as the term lime-sulphur solution is intended to cover such preparations as are described on pages 76 and 77 of the above mentioned bulletin.

Having thus fully described my invention what I claim as new and useful is:—

1. A composition of matter consisting of hydrated lime made into a plastic mass with a lime sulphur solution.

2. A composition of matter consisting of a mixture of hydrated lime and lime sulphur solution.

3. A wet composition of matter consisting of hydrated lime made into a plastic mass with a diluted lime sulphur solution.

4. A wet composition of matter consisting of a mechanical mixture of hydrated lime made into a plastic mass with a diluted lime sulphur solution.

In testimony whereof, I have hereunto affixed my signature.

CHARLES E. HITE.